J. HORN.
RUBBER SET RIFFLE.
APPLICATION FILED APR. 22, 1918.

1,276,529.

Patented Aug. 20, 1918.

Inventor:
Joe Horn,
By Hazard & Miller
Att'ys.

UNITED STATES PATENT OFFICE.

JOE HORN, OF RAY, ARIZONA.

RUBBER-SET RIFFLE.

1,276,529.  Specification of Letters Patent.  Patented Aug. 20, 1918.

Application filed April 22, 1918. Serial No. 230,025.

*To all whom it may concern:*

Be it known that I, JOE HORN, a citizen of the United States, residing at Ray, in the county of Pinal and State of Arizona, have invented new and useful Improvements in Rubber-Set Riffles, of which the following is a specification.

My invention relates to ore concentrators, and especially to riffle boards and my invention consists of the novel features herein shown, described and claimed.

Figure 1:
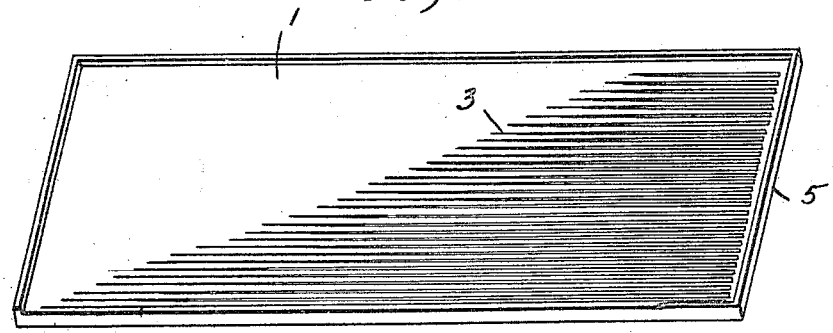
Figure 1 is a perspective of a riffle board embodying the principles of my invention.
Figure 2:
Fig. 2 is a cross section.
Figure 3:
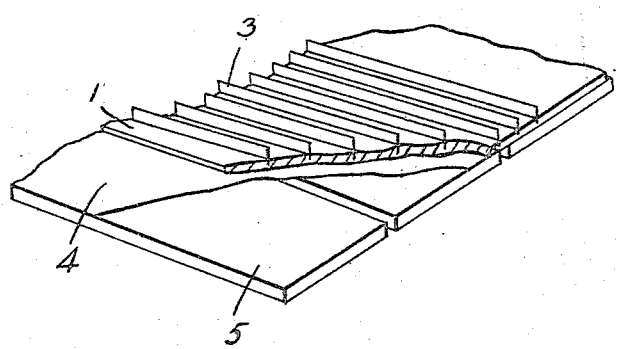
Fig. 3 is an enlarged fragmentary perspective detail.
Figure 4:
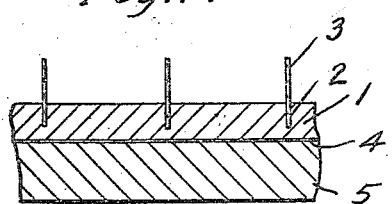
Fig. 4 is a fragmentary cross section on an enlarged scale.

I take a sheet 1 of one-quarter inch linoleum; cut grooves 2 from the upper face of the sheet about three-sixteenths of an inch deep, apply rubber cement to the grooved face of the linoleum and to the grooves, and drive the metal riffle plates 3 tightly into the grooves; then I apply a coat 4 of rubber cement to the lower face of the linoleum; and apply the linoleum to the deck boards 5. The rubber cement makes a bond between the riffle plates and the linoleum to prevent water from running around the riffle plates in the grooves and to hold the riffle plates securely in position.

The linoleum is water-proof, and the rubber cement is water-proof and the linoleum is imperforate and makes a water-proof face for the riffle board.

By the use of thin metal riffle plates 3, I am able to greatly increase the number of riffle plates upon a given area of board.

My present invention is alternative to the construction shown, described and claimed in my companion application, filed Dec. 4, 1917, Serial No. 205,425 for rubber set riffles for ore concentrators and the like.

Various changes may be made without departing from the spirit of my invention as claimed.

I claim:

1. In a concentrating table or the like, a wooden deck; a coating of water-proof adhesive material applied to the wooden deck; a sheet of non-metallic water-proof material applied to the adhesive material, and having grooves in its upper face; and riffle plates driven into the grooves.

2. In a concentrating table or the like, a wooden deck; a coating of water-proof adhesive material applied to the wooden deck; a sheet of non-metallic water-proof material applied to the adhesive material, and having grooves in its upper face; water-proof adhesive material applied to the grooves; and riffle plates driven into the grooves and water-proof adhesive material.

3. As an article of manufacture, a sheet of linoleum having grooves in its upper face, rubber cement applied to the upper face of the linoleum and to the grooves, and metal riffle plates driven into the grooves.

4. In a concentrating table or the like, a wooden deck, a coating of rubber cement applied to the wooden deck, a sheet of linoleum applied to the rubber cement and having grooves in its upper face, rubber cement applied to the upper face of the linoleum and to the grooves, and metal riffle plates driven into the grooves and cement.

In testimony whereof I have signed my name to this specification.

JOE HORN.

Copies of this patent may be obtained for five cents each, by addressing the "Commissioner of Patents, Washington, D. C."